Nov. 15, 1927.

W. H. RUTH 1,649,083

AUTOMOBILE ATTACHMENT

Filed March 2, 1927

Inventor
W. H. Ruth.
By Lacey & Lacey, Attorneys

Nov. 15, 1927.
W. H. RUTH
1,649,083
AUTOMOBILE ATTACHMENT
Filed March 2, 1927
2 Sheets-Sheet 2
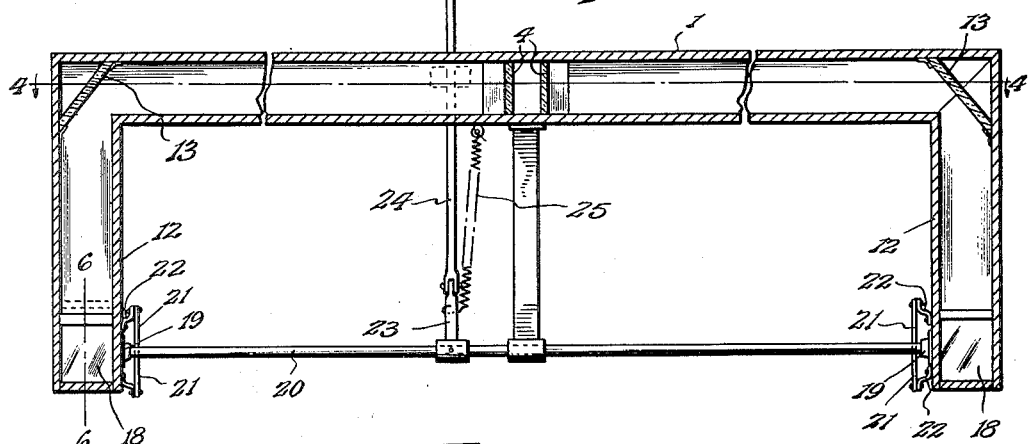
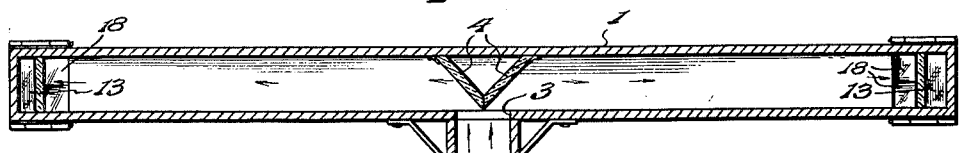
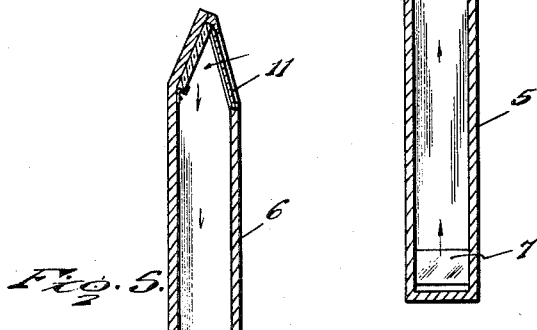
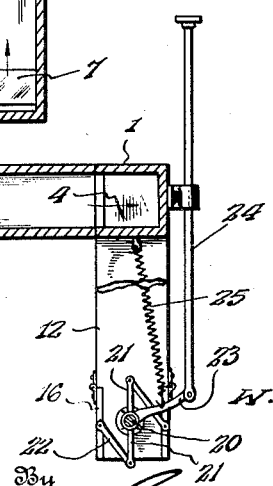
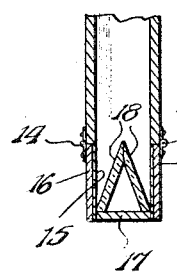
Inventor
W. H. Ruth.
By Lacey & Lacey, Attorneys Patented Nov. 15, 1927.

1,649,083

UNITED STATES PATENT OFFICE.

WALTER H. RUTH, OF GREENSBURG, KANSAS.

AUTOMOBILE ATTACHMENT.

Application filed March 2, 1927. Serial No. 172,076.

The present invention is directed to improvements in attachments for automobiles.

The primary object of the invention is to provide a device of this character which is in the nature of a periscope which can be conveniently attached to an automobile in such position that the driver of the car can readily observe the condition of the tires without leaving the seat.

Another object of the invention is to provide a device of this character constructed and arranged in such manner that the driver of the automobile can observe the condition of the tires when the automobile is in motion.

Another object of the invention is to provide a device of this kind so constructed that the sight openings adjacent the tires will be protected against the entrance of dust and moisture in order that a clear view will be had when an observation is being made.

In the accompanying drawings:

Figure 3 is a sectional view on line 3—3 of Figure 2.

Figure 4 is a sectional view on line 4—4 of Figure 3.

Figure 5 is a sectional view on line 5—5 of Figure 2.

Figure 6 is a sectional view on line 6—6 of Figure 3.

Figure 1:
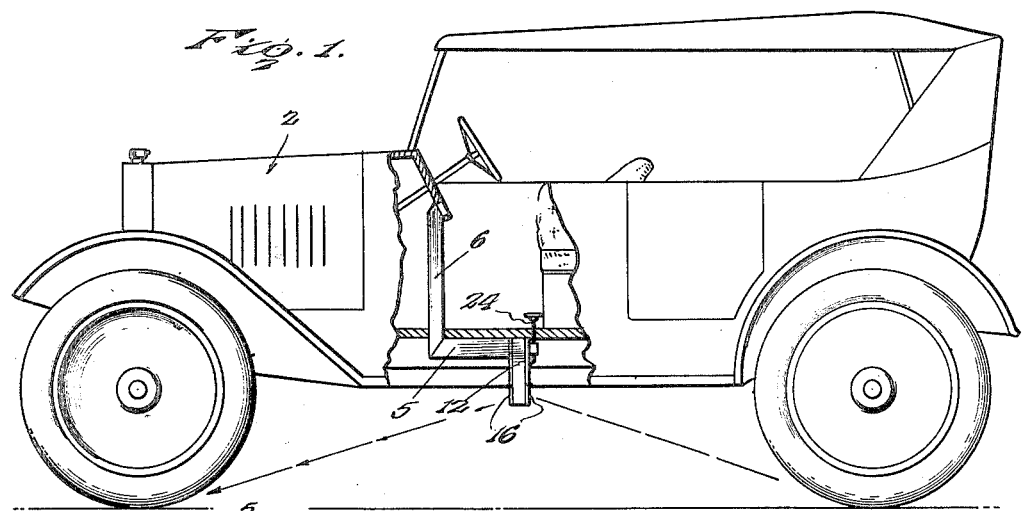
Figure 1 is a side elevation of an automobile, parts being broken away, to illustrate the position of the device with respect thereto.
Figure 2:
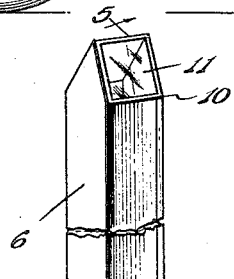
Figure 2 is a perspective view of the device.
Figure 2:
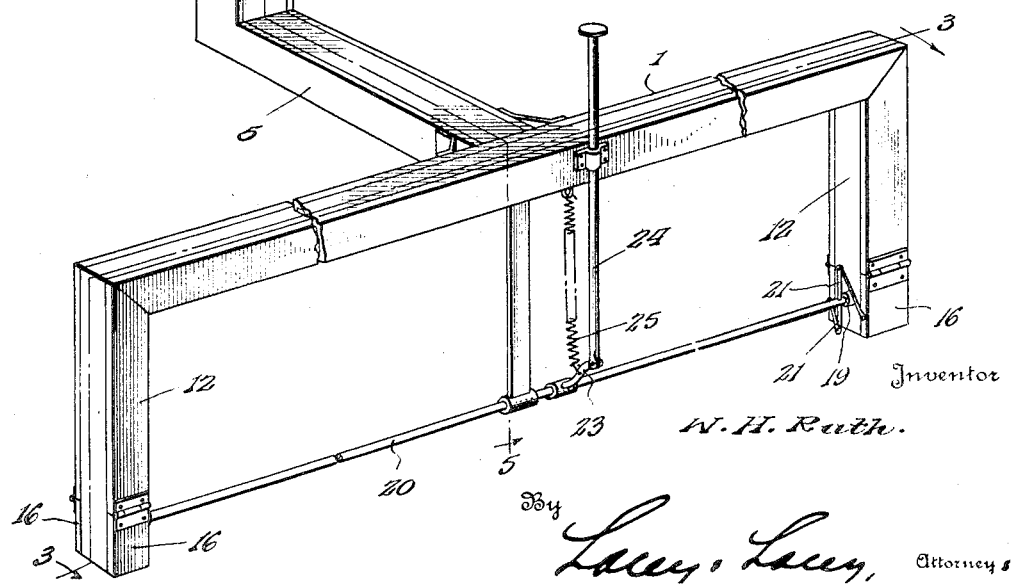

The device comprises an elongated horizontally disposed casing 1 which is of such length as to extend from side to side of the automobile 2 and has an opening 3 formed in its front wall. A pair of mirrors 4—4 are supported in the casing and are arranged with their contacting edges centrally of the opening 3, as shown in Figure 4 of the drawings. Having its upper end connected with the opening 3 is the forward end of a casing 5, the latter having its forward end communicating with the lower end of the vertical casing 6, there being a mirror 7 disposed in inclined position at the juncture of the casings 5 and 6, as shown in Figure 5 of the drawings. To the under surface of the inclined top 8 of the casing 6 is fixed a mirror 9 which is located immediately in advance of the sight opening 10 formed in the upper end of the casing 6, a glass pane 11 closing said opening. The opening 10 is located adjacent the driver of the automobile and in position for convenient observation by the driver.

Depending from the ends of the casing 1 and communicating therewith are the upper ends of the casings 12, there being mirrors 13 supported in inclined position, as more clearly shown in Figure 3 of the drawings.

The lower ends of the casings 12 are provided with front and rear openings 14 closed by a glass pane 15, there being shutters 16 hingedly mounted for each opening, which serve to prevent the entrance of dirt and moisture. Upon the bottom 17 of the casing 12 are supported convergingly arranged mirrors 18—18 so disposed that the reflecting surfaces of each mirror will be properly positioned with respect to the openings 14, as shown in Figure 6 of the drawings.

Bearings 19 are carried by the lower ends of the casing 12 and rotatably support the ends of the shaft 20, said shaft having fixed adjacent their ends oppositely extending arms 21 to which are pivoted the inner ends of the links 22, the outer ends thereof being pivotally connected to the shutters 16, the purpose of which will later appear. An arm 23 is fixed to the shaft 20 and has pivotally connected thereto the lower end of the push rod 24 slidable in the floor of the automobile, in order that the foot can be placed thereon and the rod pushed downwardly to rock the shaft 20, thus swinging the arms 21 to open the shutter 16. A coil spring 25 connects the casing 1 and arm 23 and normally holds the shaft 20 in a position to maintain the shutters closed, thereby preventing dust, or moisture from collecting on the pane 15.

It will be observed that the lower ends of the casings 12 are located between the front and rear wheels of an automobile and when it is desired to observe the condition of the tires to ascertain whether or not the same are properly inflated, the rod 24 is depressed, which rocks the shaft 20, whereupon the arms 21 will actuate the links 22 to cause the shutters to open. The tires being alined with the opening 15 will be reflected by the mirrors 18—18, 13—13, and 4—4 to the mirror 9 in order that the driver can, upon looking at the mirror 9, observe the condition of the front and rear tires without leaving the driver's seat.

Ofttimes the driver of an automobile is under the impression that a tire has been punctured, and in order to ascertain whether or not this has occurred it is necessary to stop the automobile and examine the tires, which requires that the driver leave the car for the inspection. With the present invention, it will be obvious that the driver can observe the condition of the tires while the automobile is in motion.

Having thus described the invention, I claim:

1. The combination with an automobile, of a periscope comprising a horizontal casing for disposition transversely under the automobile, vertically disposed casings having their upper ends communicating with the outer ends of the horizontal casing, mirrors disposed at the junctures of the said casings, the vertical casings having openings in their lower ends, mirrors located adjacent the openings, shutters normally closing the openings, means for operating the shutters, a casing having a mirror in its upper end disposed adjacent the seat of the automobile, a casing communicating with the last named casing and horizontal casing, mirrors disposed in the horizontal casing adjacent the last named casing, and a mirror located at the juncture of the last named casings, said mirrors being adapted to reflect the images of the automobile tires through the respective casings to the mirror adjacent the driver's seat.

2. The combination with an automobile, of a periscope including a horizontal casing for disposition transversely under the automobile, vertically disposed casings having their upper ends communicating with the outer ends of the horizontal casing and arranged between the wheels of the automobile and having openings therein, angularly disposed mirrors in the casings, shutters hingedly connected to said casings for normally closing the openings, a rock shaft having its ends journaled in the vertical casings, links having pivotal connection with the rock shaft and shutter, means for rocking the shaft to actuate the shutter to open the same to permit the images of the automobile tires to be reflected by said mirrors to a point adjacent the driver's seat of the automobile.

In testimony whereof I affix my signature.

WALTER H. RUTH. [L. S.]